Grenell, Bez & Stoll,
Automatic Gate,
Nº 49,753. Patented Sep. 5, 1865.
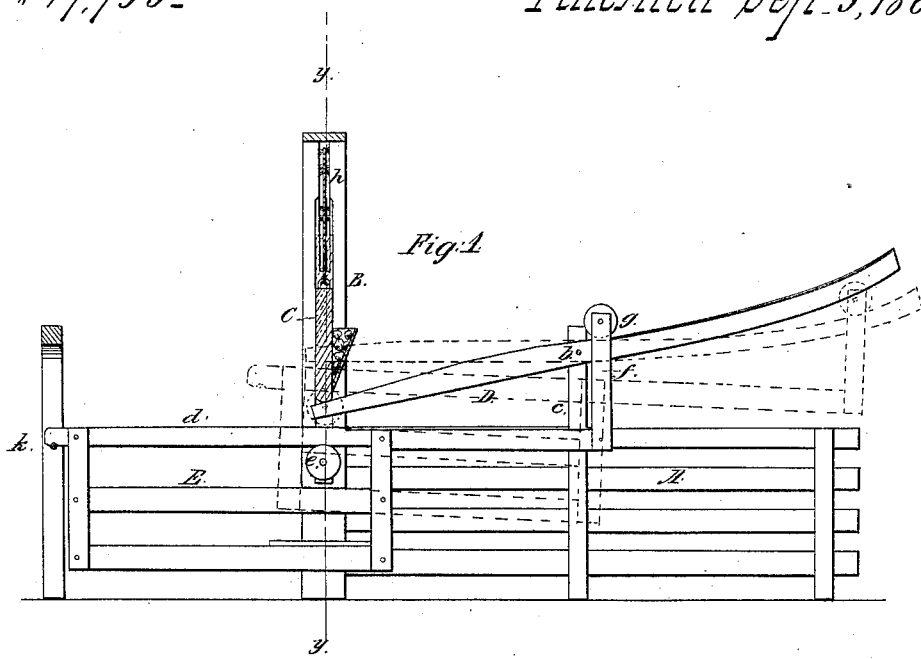
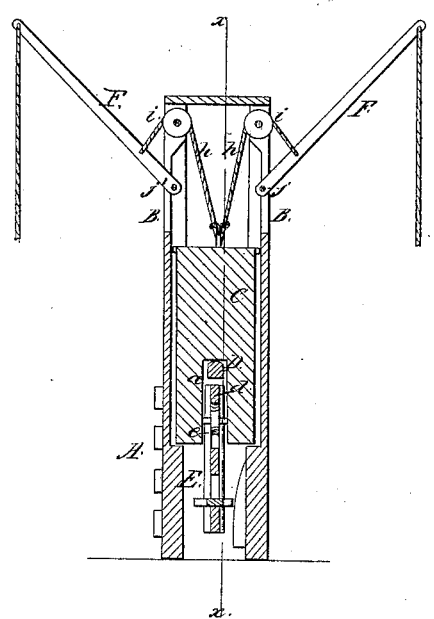
Witnesses:
Wm Oreurn
Theo Fusch
Inventor:
S. Grenell
G. Bez
H. C. Stoll

UNITED STATES PATENT OFFICE.

S. GRENELL, G. BEZ, AND H. C. STOLL, OF MOKENA, ILLINOIS.

IMPROVEMENT IN GATES.

Specification forming part of Letters Patent No. 49,753, dated September 5, 1865.

*To all whom it may concern:*

Be it known that we, SILAS GRENELL, GEORGE BEZ, and HENRY C. STOLL, of Mokena, in the county of Will and State of Illinois, have invented a new and Improved Gate; and we do hereby declare that the following is a full, clear, and exact description thereof, which will enable those skilled in the art to make and use the same, reference being had to the accompanying drawings, forming part of this specification, in which—

Figure 1 is a side sectional view of our invention, taken in the line $x\,x$, Fig. 2; Fig. 2, a transverse vertical section of the same, taken in the line $y\,y$, Fig. 1.

Similar letters of reference indicate corresponding parts.

This invention relates to a new and improved gate of that class which are capable of being opened and closed by a driver or rider without getting out of a vehicle or dismounting from a horse.

The invention consists in hanging the gate upon a lever which is attached to the fence and connected to a rising and falling slide having levers connected to it, and all arranged in such a manner that the gate may be opened and closed by a rider and driver from a vehicle or on horseback with the greatest facility.

A represents a panel or a portion of a fence, which may be constructed in any proper manner, and having two uprights, B B, attached, between which a slide, C, is fitted and allowed to slide freely up and down. This slide C is slotted vertically from its lower end upward, as shown at $a$, and in the upper part of this slot $a$ one end of a lever, D, is fitted, said lever having its fulcrum $b$ in uprights $c$, as shown in Fig. 1.

E represents the gate, the upper slat, $d$, of which rests on a roller, $e$, in the slot $a$ of the slide C, and is allowed to move freely back and forth thereon. By this movement the gate is opened and closed. The rear end of the gate has upright bars $f$ attached, having a pulley, $g$, between them at their upper ends, which rests on the lever D, as shown clearly in Fig. 1. The upper end of the slide C has two ropes, $h\,h$, attached to it, which pass over pulleys $i\,i$ in the upper parts of the uprights B B, and are attached to levers F F, the fulcra $j$ of which are at the upper parts of the uprights, as shown in Fig. 2. The slide C is of such a weight that it will descend by its own gravity and keep the rear end of the lever D elevated and the gate E closed, the inclination of the lever, when the slide C is down, causing the gate to remain closed by its own gravity.

In order to open the gate the rider or driver pulls down one of the levers F, and thereby raises the slide C and the front end of the lever D, as shown in red, Fig. 1, so that the gate will slide back or open by its own gravity. When the gate closes, its front end catches over a pin, $k$, in the post G, and is thereby prevented from being casually moved back.

We claim as new and desire to secure by Letters Patent—

The lever D and slide C, provided with or having the levers F F attached and connected with the gate E, substantially as shown and described, to operate in the manner as and for the purpose set forth.

SILAS GRENELL.
GEORGE BEZ.
HENRY C. STOLL.

Witnesses:
R. H. TURNER,
D. W. PADDOCK.